A. E. JOHNSON.
TRACTOR HITCH.
APPLICATION FILED OCT. 9, 1920.

1,378,793. Patented May 17, 1921.

Alvia E. Johnson, INVENTOR,

WITNESSES
David R. Wagner
Philip E. Siggers

BY
E. G. Siggers
ATTORNEY

UNITED STATES PATENT OFFICE.

ALVIA E. JOHNSON, OF ST. FRANCIS, KANSAS.

TRACTOR-HITCH.

1,378,793.  Specification of Letters Patent.  Patented May 17, 1921.

Application filed October 9, 1920. Serial No. 415,812.

*To all whom it may concern:*

Be it known that I, ALVIA E. JOHNSON, a citizen of the United States, residing at St. Francis, in the county of Cheyenne and State of Kansas, have invented a new and useful Tractor-Hitch, of which the following is a specification.

This invention relates to means for mounting upon a tractor for engagement with farm machinery whereby the tractor may push such machinery along roads or in fields. Such means are sometimes called tractor hitches.

The device of the present invention is particularly useful in hitching a tractor of the Fordson type to a header, although it is capable of attachment to nearly all kinds of farming implements.

The objects of the invention are to provide a tractor hitch which is readily secured to and removed from a tractor, and which does not interfere with any of the movements of the tractor, which is strong and extremely simple in construction, and which enables the tractor to push the machinery over rough ground as well as on a level.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

Figure 1:
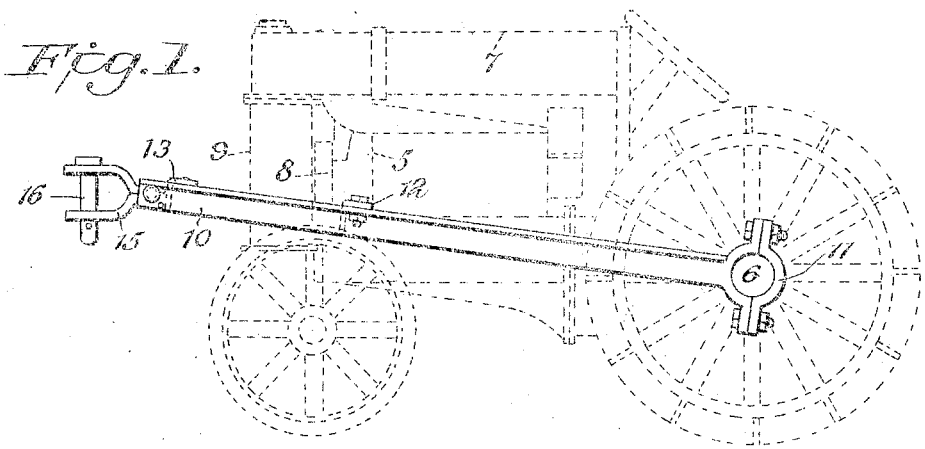
Figure 1 is a perspective view of the hitch in position upon a tractor showing the latter in dotted lines.

While the present hitching device is designed particularly for the Fordson tractor, it is capable of being secured upon other makes of tractors, and the changes necessary to adapt the hitch to various tractors are such as are within the skill of any mechanic. The showing in the drawing of a Fordson tractor and the reference thereto in the present description is to be taken not as limiting the invention but merely as illustrative of it.

The tractor shown includes the engine 5, rear axle 6, fuel tank 7, fan 8, and radiator 9. These parts are denominated merely that the disposition of the hitch upon the tractor may be better understood.

Figure 2:
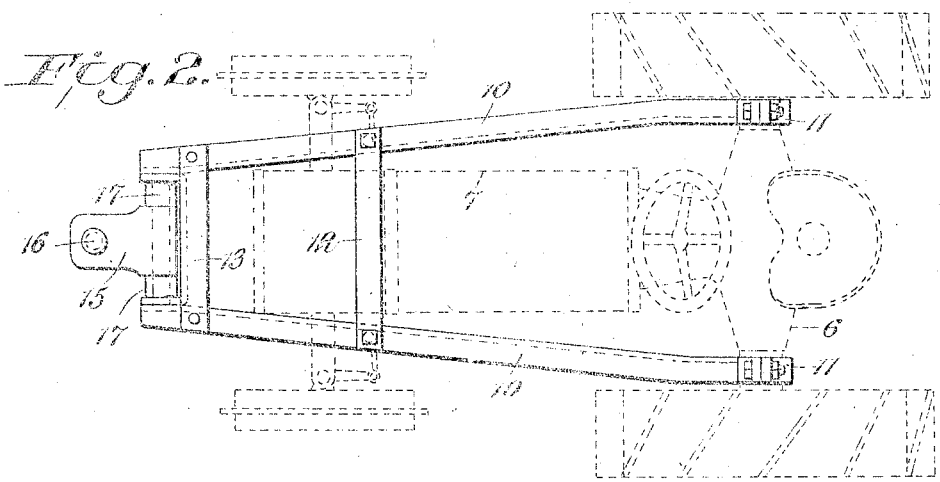
Fig. 2 is a top plan view of the same.
Figure 3:
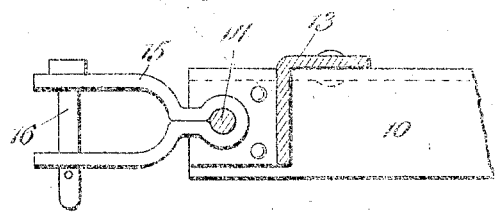
Fig. 3 is a detail partly in vertical cross section showing the mounting of the clevis at the forward end of the hitch.

The hitch which forms the subject of the present invention includes two longitudinally-extending bars 10, preferably angle bars, which have clamps 11 at one end, said clamps being adapted to embrace the axle 6 and secure the rear end of the hitch firmly in position. The rear ends of the members 10 are placed on the axle between the rear or driving wheels, where they do not interfere with the working or manipulation of any of the parts of the tractor. From a point close to the axle 6, the angle bars 10 converge as seen in Fig. 2, without however meeting. Near the forward ends of the angle bars 10 a cross-piece 13 is secured, such cross-piece preferably being a short angle bar riveted to the upper sides of the longitudinal members. A cross-brace 12 is joined to the upper flanges of the angle bars 10 by bolts or other removable elements at a point well back of the cross-piece 13. The brace 12, besides strengthening the hitch, serves to support the forward end of the same at a point elevated above the front wheels of the tractor so that the hitch may bear a considerable load. Thus the angle bars 10 not only converge forwardly, but also rise above the rear axle 6. The brace 12 preferably is supported upon the tractor back of the radiator 9 but in front of the engine 5, there being a space in most tractors in which such a brace may be received. The clamps 11 and the cross brace 12 together prevent any swinging of the hitch about the rear axle housing as an axis.

Between the extremities of the angle bars 10, a bolt or similar element 14 extends. A clevis 15 is mounted on said bolt to swing about the same as an axis, the bolt 14 being disposed horizontally. Spacing sleeves 17 are provided on each side of the clevis 15 to hold the same in an intermediate position while allowing free swinging of the clevis. A pin 16 is passed through alined holes in the clevis and provides means for attaching the header or other implement to the hitch.

Obviously, as the tractor advances, the power from the rear wheels is transmitted along the bars 10, through the clevis directly to the machine connected therewith. If the machine is proceeding over rough ground, the clevis, in its swinging, compensates for differences in level between the hitch and machine without causing the hitch itself to swing. The hitch, because of its extreme simplicity in construction and because of the employment of the angle bars, is very sturdy and transmits the power to a point directly in front of the tractor. In order to take the hitch off the tractor, it is only necessary to loosen the clamps 11 and remove the cross-brace 12. The hitch is secured to a header by merely pulling out the pin that holds the wheel on and inserting in its place the pin 16 in the clevis. Thereupon the weight of the rear end of the header is borne principally by the brace 12 and the hitch cannot swing or buckle under any conditions. Simple connecting devices are easily devised or may be purchased which will allow a tractor equipped with the hitch of the present invention to be connected to other types of farming machinery.

What is claimed is:—

1. A tractor hitching device comprising a pair of longitudinal members, means at one end of each member for holding the same to the rear axle of the tractor, said members converging forwardly relative to the tractor, a cross-piece joining the longitudinal members near their forward ends and adapted to lie in front of the radiator of the tractor, means to hold up the forward end of the hitch, and a clevis pivotally mounted on the hitch forwardly of the cross-piece to swing about a horizontal axis whereby the hitch may be connected to an agricultural implement.

2. A tractor hitching device comprising a pair of longitudinal members, clamps at one end of each member for holding the same to the rear axle of the tractor, said members converging forwardly relative to the tractor, a cross-piece joining the longitudinal members near their forward ends and adapted to lie in front of the radiator of the tractor, a cross-brace joining the longitudinal members back of the cross-piece and adapted to pass through the tractor in advance of the engine but to the rear of the radiator and hold up the forward end of the hitch, and a clevis pivotally mounted on the hitch forwardly of the cross-piece to swing about a horizontal axis whereby the hitch may be connected to an agricultural implement, the hitch extending between the two front wheels as well as the two rear wheels and rising upwardly from the rear axle to a point higher than the front or steering wheels.

3. A tractor hitching device comprising a pair of longitudinal members, means at one end of each member for holding the same to the rear axle of the tractor, said members converging forwardly relative to the tractor and arranged alongside but spaced from the same, means joining the members forward of the engine of the tractor and adapted to bear a load put upon the device, and means for hitching said joining means to an agricultural implement.

In testimony, that I claim the foregoing as my own, I have hereto affixed my signature.

ALVIA E. JOHNSON.